United States Patent [19]
DeFraites

[11] 4,209,388
[45] Jun. 24, 1980

[54] METHOD AND APPARATUS FOR TREATING SEWAGE

[76] Inventor: Arthur A. DeFraites, P.O. Box 327, Houma, La. 70361

[21] Appl. No.: 958,145

[22] Filed: Nov. 6, 1978

[51] Int. Cl.² .............................................. C02C 1/02
[52] U.S. Cl. ........................................ 210/8; 210/16; 210/170; 210/195.1; 47/1.4
[58] Field of Search ................ 210/11, 2, 18, 3–8, 210/14–16, 170, 194, 195.1; 47/1.4, 58

[56] References Cited

U.S. PATENT DOCUMENTS

| | | | |
|---|---|---|---|
| 2,867,945 | 1/1959 | Gotaas et al. ............................ 210/2 |
| 3,431,200 | 3/1969 | Davis et al. ............................. 47/1.4 |
| 3,485,750 | 12/1969 | Albertson ................................ 210/8 |
| 3,598,726 | 8/1971 | Welch ..................................... 210/3 |
| 3,780,471 | 12/1973 | Ort .......................................... 210/170 |
| 3,819,512 | 6/1974 | Praznovsky et al. .................. 210/15 |
| 4,005,546 | 2/1977 | Oswald .................................. 210/11 |

Primary Examiner—Benoît Castel

Attorney, Agent, or Firm—Clarence A. O'Brien; Harvey B. Jacobson

[57] ABSTRACT

Steps are disclosed in a method for the complete treatment of sanitary sewage comprising water containing suspended or dissolved organic matter, the concentration of which is measured by biochemical oxygen demand (BOD). A part of the method relies upon a waste stabilization pond containing algae for aerobic decomposition of the organic matter, followed by removal of algae in a second algae removal pond. Another aspect of the invention is provision of a polishing pond constructed with a circumferential weir for maximizing exposure to sunlight and for aeration. A further aspect of the method of the invention involves optional provision of a facultative pond of increased capacity for reduction of BOD by use of combined aerobic and anaerobic treatment which avoids the drawbacks commonly associated with entirely anaerobic treatment processes.

23 Claims, 11 Drawing Figures

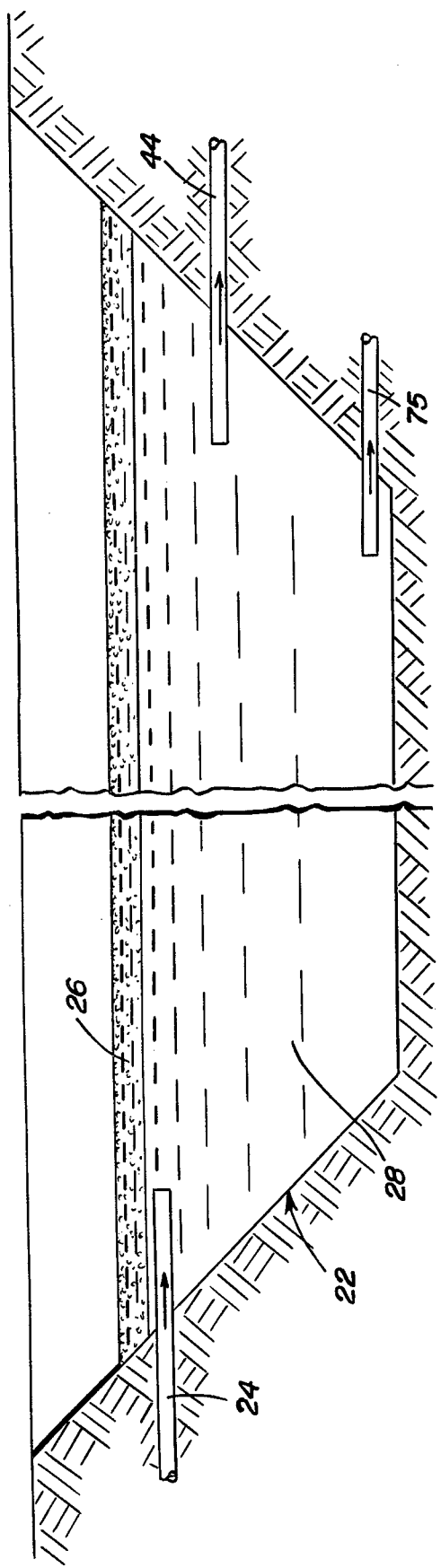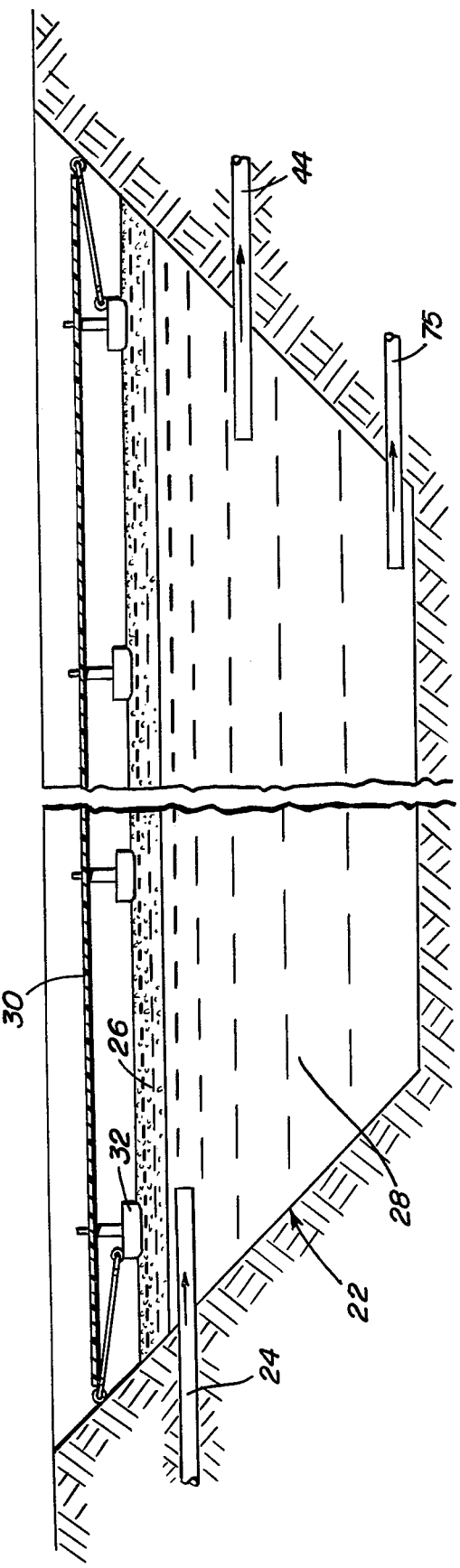

METHOD AND APPARATUS FOR TREATING SEWAGE

BACKGROUND OF THE INVENTION

1. Field of the Invention

The invention relates to methods, each of which comprises improvements forming a part of a system for the complete treatment of sanitary sewage. More particularly, one method encompasses treatment in a waste stabilization pond in which the BOD level of such sewage is reduced by aerobic decomposition through action of algae, followed by removal of the algae in an algae removal pond. The invention also contemplates in a later stage of treatment use of a polishing pond having a weir for aeration and exposure of treated effluent to sunlight. The invention also encompasses for an early stage of treatment use of a facultative pond in which combined aerobic and anaerobic decomposition takes place, permitting a substantially increased volume of sewage to be treated while avoiding drawbacks commonly associated with entirely anaerobic treatment.

2. Description of the Prior Art

It is known to grow microorganisms for oxidation of waste matter to reduce its BOD by 85% to 95%, such as in the method and apparatus described by Torpey in U.S. Pat. No. 3,849,303, issued Nov. 19, 1974. A drawback of the method and apparatus of Torpey is the requirement for rotating biological contactors, which limits the size and volume of the container for carrying out the process, as well as the volume of sewage that can be treated.

U.S. Pat. No. 3,260,368, issued July 12, 1966, to Wagner et al, discloses a sewage disposal system employing apparatus which has an upper chamber where aerobic digestion takes place, as well as a lower chamber for anaerobic digestion. Disadvantages associated with the Wagner system include high cost of construction, involving provision of equipment for heating, aspirating, and circulating the liquid undergoing treatment. Aeration by introduction of compressed air necessitates equipment, such as compressors, aerators, and associated piping. Moreover, separate aerobic and anaerobic tanks are required in the Wagner method. Separate tanks for aerobic and anaerobic treatment are also disclosed in U.S. Pat. No. 3,666,106, issued May 30, 1972, to Green. U.S. Pat. No. 3,878,101, issued Apr. 15, 1975, to Kennedy, shows weir drains for removing treated sewage. Such drains, however, do not provide substantial exposure to air and sunlight, and require special fabrication of channels. Seidel in U.S. Pat. No. 3,770,623, issued Nov. 6, 1973, teaches removal of suspended and dissolved pollutants through use of vegetation rooted in beds into which the liquid is introduced.

Other patents disclosing prior art treatment methods and apparatus are the following:

U.S. Pat. No. 942,697—Dec. 7, 1909—Allen
U.S. Pat. No. 2,657,178—Oct. 27, 1953—Robinson
U.S. Pat. No. 3,036,713—May 29, 1962—Lambeth
U.S. Pat. No. 3,047,492—July 31, 1962—Gambrel
U.S. Pat. No. 3,166,501—Jan. 19, 1965—Spohr
U.S. Pat. No. 3,337,454—Aug. 22, 1967—Gruenwald
U.S. Pat. No. 3,443,694—May 13, 1969—Malinovsky
U.S. Pat. No. 3,561,945—Feb. 9, 1971—Kilburn
U.S. Pat. No. 3,563,383—Feb. 16, 1971—Hellquist, et al.
U.S. Pat. No. 3,591,492—July 6, 1971—Neuspiel
U.S. Pat. No. 3,638,793—Feb. 1, 1972—Peck
U.S. Pat. No. 3,682,307—Aug. 8, 1972—Cook, et al.
U.S. Pat. No. 3,756,946—Sep. 4, 1973—Levin, et al.
U.S. Pat. No. 3,835,038—Sep. 10, 1974—Heaney
U.S. Pat. No. 3,900,394—Aug. 19, 1975—Rongved
U.S. Pat. No. 3,914,173—Oct. 21, 1975—Call, et al.
U.S. Pat. No. 3,933,640—Jan. 20, 1976—Kirk
U.S. Pat. No. 3,959,124—May 25, 1976—Tchobanoglous.

SUMMARY OF THE INVENTION

It is an object of the present invention to uniformly dispose of effluent in a sewage treatment pond through use of a land area to upgrade the quality of effluent. Effluent flows over and through vegetation, with overflow upon a wide outer side of a levee or weir to form a thin film with maximum exposure to air and sunlight.

Another object of the invention is to provide an improved facultative waste stabilization pond for initial steps in waste treatment.

Another object of the invention is to provide a facultative waste stabilization pond capable of treating an amount and concentration of sewage per acre approximately double the quantity which can be applied to an entirely aerobic treatment pond. Combined aerobic and anaerobic decomposition takes place without the drawbacks conventionally associated with anaerobic conditions.

Yet another object of the invention is to provide a process for aerobic treatment of sewage by action of algae in the upper level of a pond, followed by a removal of the algae in an algae removal pond.

Yet a further object of the invention is to upgrade the quality of effluent from treatment of sewage by combination of various of the steps disclosed in the foregoing objects.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged vertical sectional view of an algae removal pond, corresponding to the middle pond shown in FIG. 1.

FIG. 5 is a second embodiment of an algae removal pond, showing a floating cover to assist in exclusion of sunlight and sustenance.

DESCRIPTION OF THE PREFERRED EMBODIMENTS

The invention described herein contemplates a process for performing steps making up part of a system for the complete treatment of santiary sewage.

Figure 1:
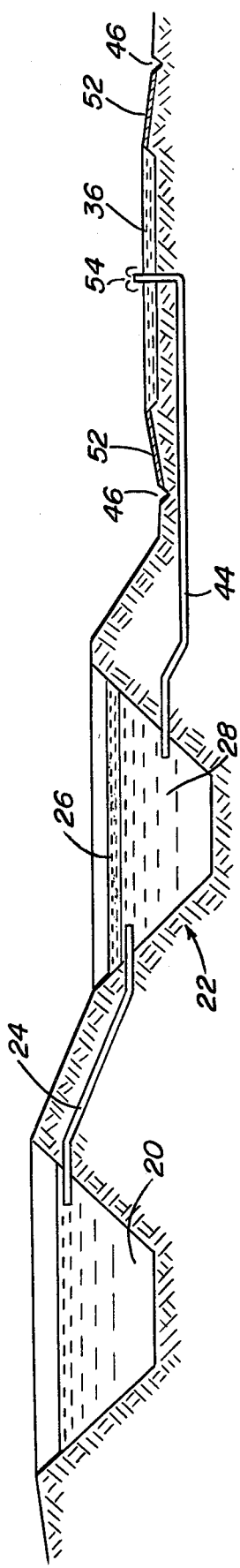
FIG. 1 is a schematic representation of an arrangement of successively connected ponds incorporating each of the steps taught by the present invention.

Sewage can be treated in an open pond or lagoon, represented schematically in FIG. 1 as waste stabilization pond 20. Waste stabilization pond 20 can be of many types, such as a facultative pond or an aerated pond.

Facultative ponds, typically having depths from about four to six feet, decompose sewage in a section in the lower level of the pond and in a section in the upper level through the action of a class of many kinds of algae commonly called "green algae". Live algae exist in approximately the upper two feet of a facultative pond, where they thrive by photosynthesis and produce oxygen used in the decomposition process in the lower levels of the pond and the decomposition process in the upper levels. However, the amount and concentration (biochemical oxygen demand or BOD) of sewage which can be applied per acre of facultative pond area is limited, since an excessive application will cause the pond to become anaerobic and septic throughout its entire depth. The algae will then change to "blue-green algae", and undesirable characteristics, such as obnoxious odors, will result. Although a large volume of sewage can be treated in such anaerobic ponds, constructed with a depth of 12 feet or more, the anaerobic condition will produce gases, such as hydrogen sulfide, with offensive odors, resulting in air pollution and environmental degradation if such gases are allowed to escape from the pond. Containment of the gases is impractical for ponds of large surface area, since covering means would be expensive and it is essential to provide sunlight for the facultative pond.

Another type of pond which can be used for decomposition of organic material is the aerated pond, within which air is mechanically introduced to furnish oxygen for metabolism of the bacteria which promote aerobic decomposition of such organic matter. In this manner aeration performs the function wholly or partially performed by the algae by supplying the oxygen needed for oxidation of the organic matter. An aerated pond can be deeper than a facultative pond if the oxygen is supplied principally mechanically, or an aerated pond can be shallow, with mechanical means being used to supplement the activity of the algae.

Figure 6:
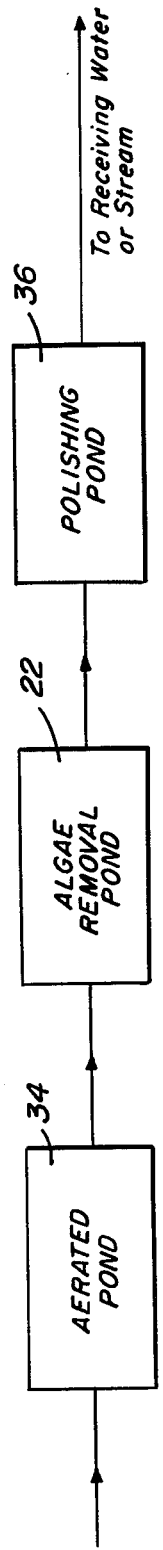
FIG. 6 is a schematic representation of a process for the complete treatment of sanitary sewage, constituting the first embodiment of the process of the invention.
Figure 7:
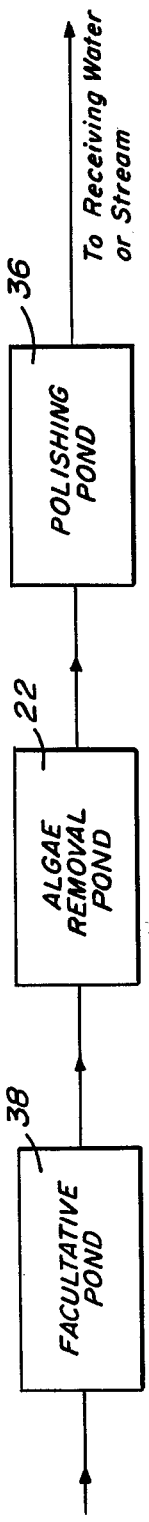
FIG. 7 is a schematic representation of a second embodiment of a process which is an alternative to the process of FIG. 6.

Facultative ponds and aerated ponds typically produce an effluent in which the BOD has been reduced by about 60% to about 85%, determined by the precise environmental conditions of the pond location, including such factors as air temperature, degree of solar irradiation, wind speed, and other factors. Both facultative ponds and aerated ponds, however, furnish an effluent containing live algae with a proportion of dead algae. Since the live algae will not settle out, they add both biochemical oxygen demand and suspended solids to the effluent. Accordingly, algae removal pond 22 is provided for treating effluent from waste stabilization pond 20 passing through connecting pipeline 24 from pond 20 to pond 22. Algae removal pond 22 is constructed to cause algae introduced through pipeline 24 to die and settle under quiescent conditions. Blanket 26 on the surface of algae removal pond 22 prevents penetration of sunlight into the underlying liquid 28, and live algae entering pond 22 through pipeline 24 expire under deprivation of both the sunlight and the sustenance required and settle to the bottom of pond 22. To further hasten the destruction of live algae, algae removal pond 22 can be covered using an artificial blanket, such as styrofoam, or other suitable lining material 30 supported on floats 32, as shown in FIG. 5. A process utilizing either the algae removal pond of FIG. 4 or that of FIG. 5, in conjunction with an aerated pond 34 is shown in FIG. 6. Alternatively, a process in which the initial stage of treatment is a facultative pond 38 is shown in FIG. 7.

Figure 8:
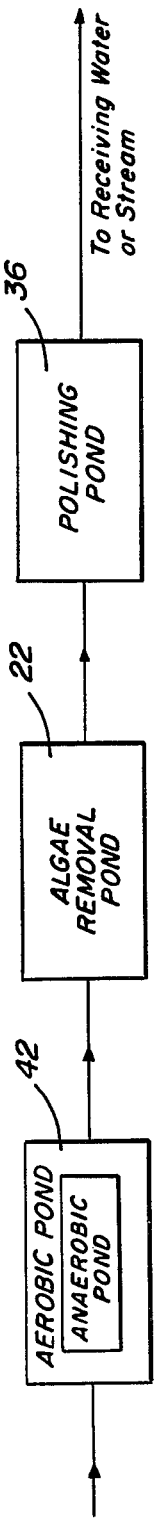
FIG. 8 is a schematic representation of a third embodiment, utilizing combined aerobic and anaerobic digestion in the first stage of treatment.

In a third process, shown in FIG. 8, algae removal pond 22 functions with effluent from a combined aerobic and anaerobic pond 42. Combined pond 42 is constructed with sloping sides as illustrated by pond 20 in FIG. 1, so that a deeper section is placed in the center area, comprising approximately one-third of the total area of the pond. In a pond of such a construction, the amount and concentration (measured by BOD) of sewage that may be applied per acre can be approximately double that applied to a facultative pond without causing the entire pond to become anaerobic, and therefore without producing the offensive odor associated with entirely anaerobic conditions. Experiments have demonstrated that a pond having an aerobic section with a depth of about four to six feet, along with a central anaerobic section which is twelve feet or more deep, will at least double the concentration of organic material, measured in BOD per acre, that can be treated without creating a nuisance. By properly proportioning the area of the aerobic section, along with the area of the anaerobic section, a maximum proportion of anaerobic treatment can be obtained with elimination of the nuisance of offensive odors through the aerobic action occurring in the upper levels of the pond. Consequently, the area required to treat a given volume of sewage with a given BOD is reduced.

Algae die off in algae removal pond 22 is accomplished by minimizing the carbon containing food source of the algae and by minimizing the euphotic zone in pond 22. Since raw sewage containing organic material is not introduced into pond 22, there is no direct introduction of a carbon containing food source other than that carried through pipeline 24. The euphotic zone is minimized through either natural or artifical means, including blanket 26 or cover 30. Blanket 26 can result from a heavy concentration of algae in effluent passing through pipeline 24, or, alternatively, blanket 26 can consist of a layer of wood bark, wood shavings, sawdust, or similar material, styrofoam floats, or a combination of these or similar floating materials. Moreover, an enclosed tank can be substituted for pond 22, the tank top comprising the cover for excluding sunlight.

Preferably, flow through algae removal pond 22 is obtained by means of discharge through pipeline 44 at a level below blanket 26. Retention time in algae removal pond 22 is preferably about four to eight days, while retention time in waste stabilization pond 20 is from about 15 to 30 days. Since the entire effluent from pond 20 enters pond 22 through pipeline 24 it is apparent from the retention times stated that the surface area of algae removal pond 22 is considerably less than that of waste stabilization pond 20. Retention time of liquid in algae removal pond 22 is chosen so that algae therein will die and settle to the bottom of pond 22.

Flow from algae removal pond 22 through pipeline 44 takes place from a level below blanket 26 and liquid flows by gravity or pumping means (not shown) into polishing pond 36. Although a polishing pond has been illustrated as the final stage of treatment in the drawings, other means can be substituted for the last stage, such as land disposal or filtration. When a polishing pond is employed, the construction of polishing pond illustrated in FIGS. 2 and 3 provides advantages in consistently producing a high quality effluent for ultimate disposition.

Figure 2:
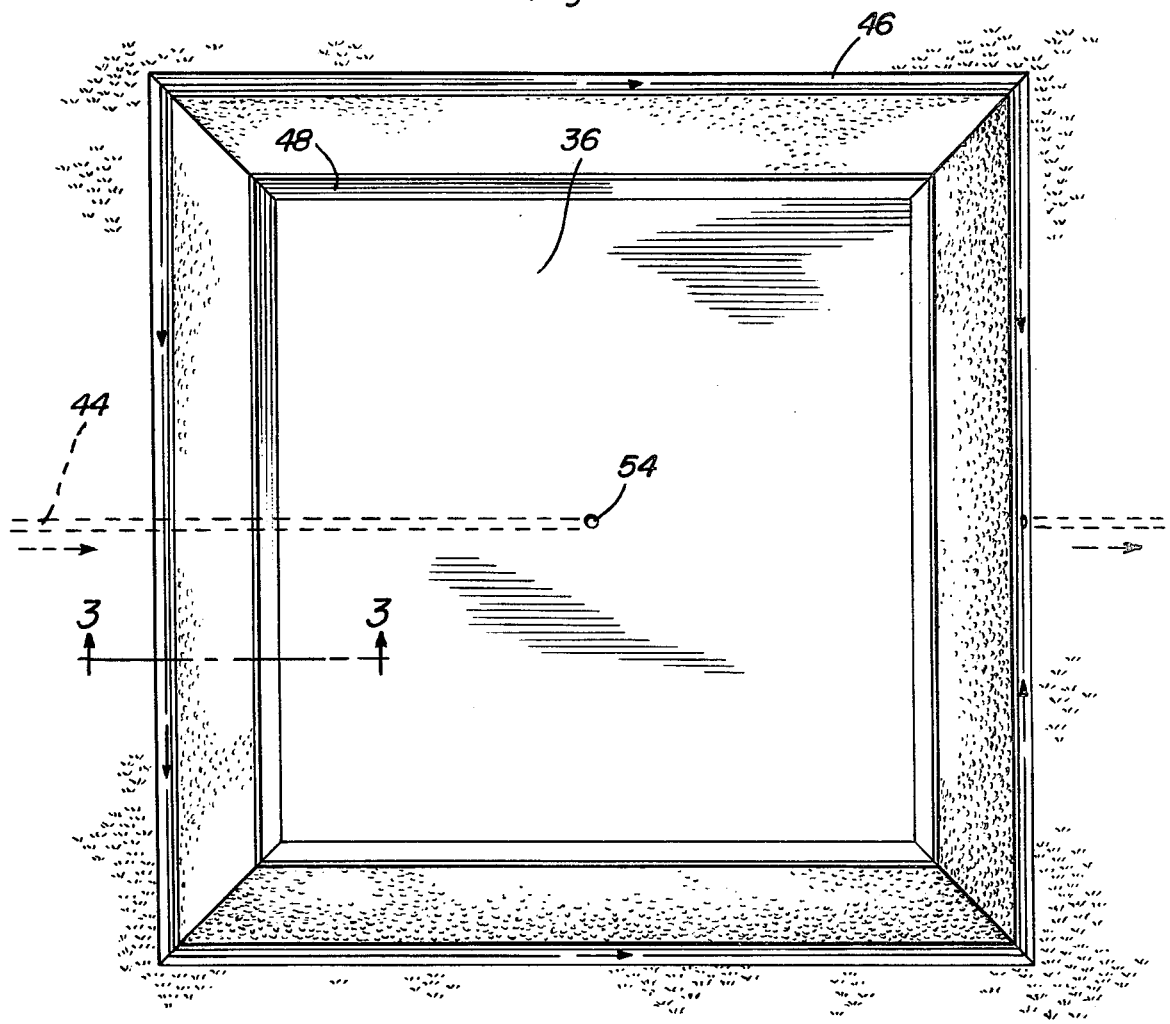
FIG. 2 is a top plan view of a polishing pond forming the final stage of treatment in the representation of FIG. 1.
Figure 3:
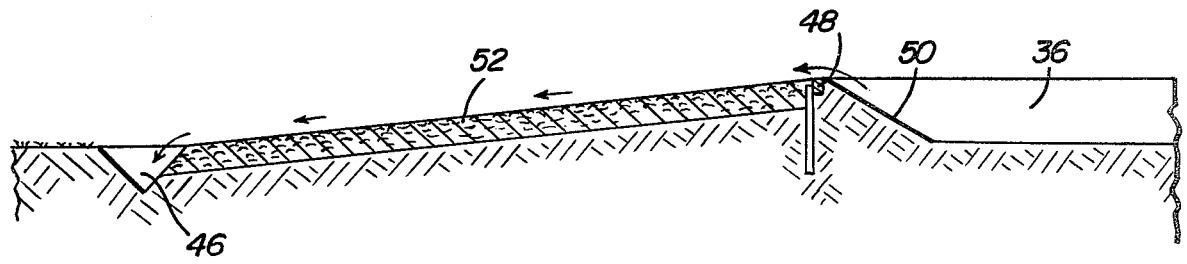
FIG. 3 is an enlarged fragmentary sectional view of the pond of FIG. 2, taken substantially upon a plane passing along section line 3—3 on FIG. 2.

In FIG. 2, a shallow polishing pond 36 is formed by enclosing a flat area with a low flat rise extending upwardly from ditch 46 around the outside of the levee to weir 48, around the inside parameter of the levee and forming the highest point thereon. The inner face 50 of the levee can conveniently be constructed with a slope of approximately 3 to 1, while outer surface 52 of the levee can be approximately 20 feet wide or wider, and has a relatively small degree of slope. In order to prevent engulfing of outer surface 52 of the levee with vegetation, outer slope 52 is provided with a surfacing of shells or gravel for easy access by mowing equipment. Influent inlet 54 is located near the center of pond 36, receiving effluent through pipeline 44. Although discharge of effluent through pipeline 44 is shown in FIG. 1 in the form of an upwardly directed spray, such effluent can also be conveniently introduced without spray, or from below the surface of liquid in pond 36.

In order to control the flow of liquid leaving pond 36, weir 48 is located at uniform height completely around the levee. Weir 48 maintains a substantially uniform rate of discharge in a thin film over the entire outer surface 52 of the levee. Such relatively uniform flow gives maximum exposure of the entire effluent to aeration and sunlight. Marsh grass or other suitable species of vegetation is allowed to grow in pond 36. Flow through pipeline 44 is regulated to provide flow from influent inlet 54 through the growth of vegetation to discharge weir 48 at a relatively uniform rate over the entire surface of the pond. Flow through the growth of vegetation at a uniform dispersal rate results in mixing, aeration, and exposure to sunlight.

When land is available at reasonable cost, processes of this invention require reduced consumption of energy, reduced use of skilled manpower, and are far less subject to upset than any of the conventional activated sludge processes for treatment of sanitary sewage. Moreover, a high quality effluent is consistently produced by the process of the present invention.

The retention time of liquid in algae removal pond 22 is of such duration that the algae therein will die and settle to the bottom of pond 22. Retention time in waste stabilization pond 20 is conveniently from 15 to 30 days with retention time in algae removal pond 22 being only from about 4 to 8 days.

The following examples illustrate systems for the complete treatment of sanitary sewage utilizing some or all of the processes of the present invention.

EXAMPLE I

Figure 9:
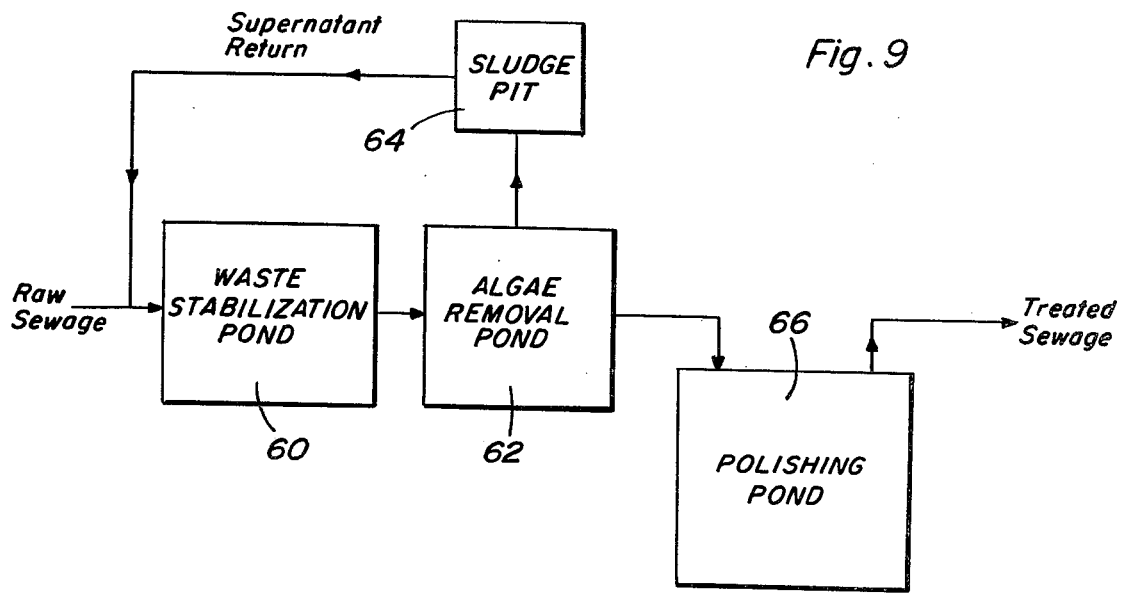
FIG. 9 is a schematic representation of a fourth embodiment, showing removal of sludge from the bottom of the algae removal pond.

In accordance with the schematic representation of FIG. 9, raw sewage enters waste stabilization pond 60, which can be a facultative pond or a combined aerobic and anaerobic pond, as described above. After retention in waste stabilization pond 60 for a suitable period of time, which can be from approximately 15 to 30 days, effluent passes to algae removal pond 62, which can be a covered pond as illustrated in FIG. 5, having an algae blanket, or can be a pond similar to that illustrated in FIG. 4, where the blanket of dead algae prevents entrance of sunlight and sustenance to cause live algae to die and settle to the bottom of pond 62. Dead algae forming in the bottom of algae removal pond 62 are discharged into sludge pit 64 for final decomposition. Supernatant from sludge pin 64 is returned to waste stabilization pond 60. Effluent from algae removal pond 62 passes into polishing pond 66 for final treatment in the manner described above in connection with discussion of FIGS. 2 and 3, and the final effluent of treated sewage is of consistently high quality.

EXAMPLE II

Figure 10:
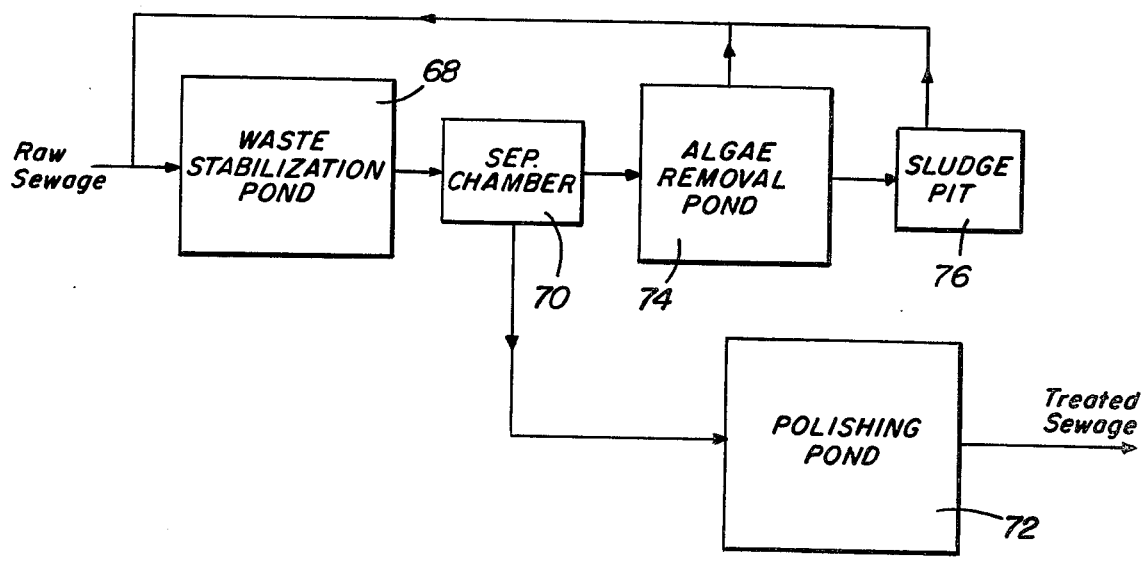
FIG. 10 is a schematic representation of a fifth embodiment, having an additional chamber interposed between the initial treatment pond and the algae removal pond.

The system represented schematically in FIG. 10 includes waste stabilization pond 68, which can be an aerated pond, a facultative pond, or a combined aerobic and anaerobic pond, receiving raw sewage and discharging effluent into separation chamber 70, which separates liquid into an algae-free stream passing to polishing pond 72, and an algae-containing stream, which passes to algae removal pond 74, constructed in the manner of either FIGS. 4 or 5. Dead algae forming in pond 74 settle to the bottom of pond 74, and are discharged through lines 75 into sludge pit 76 for final decomposition. Other equivalent means for removing the dead algae sludge from the bottom of pond 74 can be used. Supernatant from sludge pond 76 is returned, along with discharge from algae removal pond 74, to the inlet of waste stabilization pond 68. The final effluent of treated sewage is of consistently high quality for further treatment or for discharge into the environment.

EXAMPLE III

Figure 11:
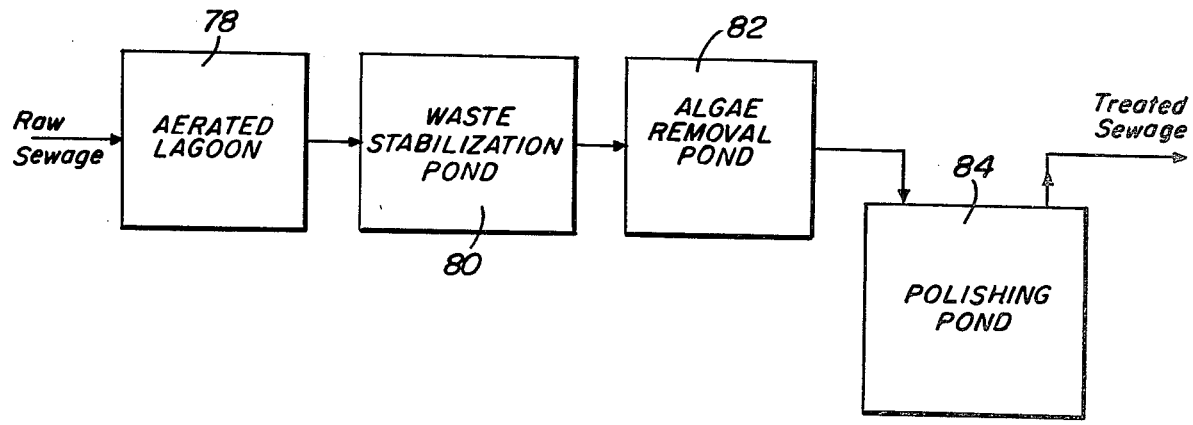
FIG. 11 is a schematic representation of a sixth embodiment of the invention, showing retention of the raw sewage in an aerated lagoon before the first stage of treatment in a waste stabilization pond.

In FIG. 11, raw sewage is first treated in aerated lagoon 78 before treatment in waste stabilization pond 80, algae removal pond 82, and polishing pond 84. Pond 80 can be an aerated pond, facultative pond, or combined aerobic and anaerobic pond; pond 82 can be a covered algae removal pond, such as that of FIG. 5, or an uncovered pond having a blanket, such as that of FIG. 4. Polishing pond 84 is preferably of the type illustrated in FIG. 2.

In each of Examples I, II and III, treated sewage forming the final product discharged from the polishing pond can be further subjected to filtration before further discharge into the environment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A method for treatment of raw sanitary sewage in a series of interconnected treatment ponds comprising a waste stabilization pond containing live algae, an algae removal pond having means for minimizing the euphotic zone therein by excluding sunlight and sustenance from live algae discharged thereinto from said waste stabilization pond, a sludge pit, and a polishing pond for further upgrading liquid discharged thereinto from said algae removal pond, comprising the following steps:
   (a) passing said sewage into said waste stabilization pond for decomposition and reduction of biochemical oxygen demand by said live algae;
   (b) passing live algae containing liquid from said waste stabilization pond into said algae removal pond to cause said live algae to die and separate from liquid therein, thereby forming a sub-surface liquid layer therein substantially free of algae;
   (c) discharging substantially algae-free liquid from said subsurface layer in said algae removal pond into said polishing pond for further reduction of biochemical oxygen demand of liquid therein and liquid flowing therefrom by exposure to aeration and sunlight and simultaneously passing said separated dead algae into a sludge pit in the form of a liquid suspension;
   (d) separating the dead algae in the sludge pit from a liquid supernatant;
   (e) recycling said supernatant to said waste stabilization pond; and
   (f) collecting treated liquid from said polishing pond and discharging said collected treated liquid for final disposal.

2. The method of claim 1 wherein live algae in step (b) are caused to die and separate by excluding sunlight and sustenance from live algae discharged thereinto with a buoyant blanket on the surface of said algae removal pond.

3. The method of claim 2 wherein the retention time of liquid in said algae removal pond is regulated to cause said live algae therein to die, and to allow dead algae produced thereby to settle to the bottom of said algae removal pond and form said sub-surface layer.

4. The method of claim 3 wherein said retention time is about four to about eight days.

5. The method of claim 1 wherein said sewage is retained in said waste stabilization pond for a retention time of about 15 to about 30 days.

6. A method for treatment of raw sanitary sewage in a series of interconnected treatment ponds comprising a waste stabilization pond containing live algae, a separation chamber for separation of liquid into a substantially algae-free liquid stream and a live algae-containing stream, an algae removal pond having means for minimizing the euphotic zone therein by excluding sunlight and sustenance from live algae discharged thereinto from said separation chamber, a sludge pit, and a polishing pond, comprising the following steps:
   (a) passing said sewage into said waste stabilization pond for decomposition and reduction of biochemical oxygen demand by said live algae;
   (b) passing liquid containing live algae from said waste stabilization pond into said separation chamber;
   (c) passing said live algae-containing stream from said separation chamber into said algae removal pond to cause said live algae therein to die and separate from liquid in a sub-surface layer;
   (d) transferring separated dead algae from said algae removal pond to said sludge pit;
   (e) combining substantially algae-free liquid from said sub-surface layer of said algae removal pond with supernatant liquid separated from said sludge pit to form a recycled liquid;
   (f) passing said recycled liquid into said waste stabilization pond;
   (g) passing said substantially algae-free stream from said separation chamber into said polishing pond; and
   (h) collecting treated liquid from said polishing pond for discharge of said treated liquid for final disposal.

7. The method of claim 6 wherein said sewage is retained in said waste stabilization pond for a retention time of about 15 to about 30 days.

8. In the treatment of sanitary sewage, a combined aerobic and anaerobic pond including inlet means for receiving sanitary sewage influent and outlet means for withdrawing treated effluent, the pond consisting of a central section and a surrounding section, the central section having an upper aerobic zone for growth of one or more aerobic species of algae and a lower anaerobic zone for growth of one of more species of anaerobic algae therein, the central section having a depth of at least about 12 feet to encompass said zones, the surrounding section being entirely aerobic for growth of one or more of said species of aerobic algae, said surrounding section having a depth less than about six feet, the inlet means for receiving the influent into the pond being located at said central section, wherein said central section covers about one-third of the area of said combined aerobic and anaerobic pond, whereby the amount and concentration (measured by biochemical oxygen demand) of sewage treatable is greater than the maximum obtainable with an entirely aerobic pond, subject to the requirement that offensive odors not be generated from the pond.

9. In a system for treating sanitary sewage, a polishing pond for processing of treated effluent into high quality treated sewage by exposure to aeration, sunlight, and reaction with vegetation, wherein said polishing pond has influent inlet means located near the center of the pond, and is formed from a perimetric levee surmounted by a weir of substantially uniform height, said levee having an outer surface sloping downwardly and outwardly from said weir to a toe in order to permit distribution of liquid discharge from said weir substantially equally in a thin film over said outer surface whereby the entire effluent is exposed to aeration and sunlight, wherein said outer surface is approximately 20 feet wide and comprises a shell or gravel surfacing to permit travel by mowing equipment, the depth of said polishing pond being selected to permit growth of vegetation therein suitable for reaction with liquid filling said polishing pond, whereby a high quality effluent is consistently producable for ultimate disposition.

10. A system for treatment of raw sanitary sewage in a series of interconnected ponds comprising a waste stabilization pond having inlet means and containing live algae, a separation chamber for separation of liquid into a substantially algae-free liquid stream and a live algae-containing stream, an aglae removal pond having means for minimizing the euphotic zone therein by exclusion of sunlight and sustenance from live algae dischargeable thereinto from said separation chamber, a sludge pit, and a polishing pond, the waste stabilization pond being for decomposition of said sewage and reduction of biochemical oxygen demand by said live algae, the waste stabilization pond being fluidly connected to the separation chamber for passage of liquid from the waste stabilization pond to the separation chamber, the separation chamber being fluidly connected to said algae removal pond, the algae removal pond having a surface layer in which said live algae die and separate from a sub-surface layer, the sludge pit being fluidly connected to the algae removal pond for transfer of separated dead algae from the algae removal pond to the sludge pit, the algae removal pond having discharge means for removing liquid from said sub-surface layer and said sludge pit having removal means for discharge of supernatant liquid from the sludge pit, the discharge means and removal means being fluidly connected together to form return means for conducting effluent consisting of the sub-surface layer liquid and supernatant liquid into said inlet means of said waste stabilization pond, the separation chamber being fluidly connected to the polishing pond, the polishing pond having removal means for discharge of treated liquid for final disposal.

11. The system of claim 10 wherein said waste stabilization pond comprises an aerated pond.

12. The system of claim 10 wherein said waste stabilization pond is a combined aerobic and anaerobic pond consisting of a central section and a surrounding section, the central section having an upper aerobic zone and a lower anaerobic zone, with the surrounding section being entirely aerobic, whereby oxyen produced in upper levels of the pond by live algae satisfies biochemical oxygen demand in said upper levels and anaerobic decomposition proceeds in lower levels of said pond.

13. The system of claim 10 wherein said polishing pond is formed from a low flat levee surmounted by a weir passing completely around the levee at substantially uniform height, the levee having an outer surface sloping downwardly and outwardly to a toe from said weir for distributing liquid discharge from said polishing pond to give maximum exposure of the discharge to the aeration and sunlight.

14. The system of claim 13 wherein said discharge from said polishing pond is collected by ditching at the toe of said outer surface, and said polishing pond has a depth suitable for growing of vegetation therein to promote mixing, aeration and exposure to sunlight.

15. A system for treatment of raw sanitary sewage in a series of interconnected treatment ponds comprising a waste stabilization pond having inlet means and containing live algae, an algae removal pond having means for minimizing the euphotic zone therein by exclusion of sunlight and sustenance from live algae dischargeable thereinto from the waste stabilization pond, a polishing pond for further upgrading of liquid dischargeable thereinto from the algae removal pond, and a sludge pit for separation of dead algae from the algae removal pond, the waste stabilization pond for decomposition and reduction of biochemical oxygen demand by said algae being fluidly connected to the algae removal pond, the algae removal pond forming a sub-surface liquid layer therein substantially free of algae, the sludge pit being fluidly connected to the algae removal pond for transfer of separated dead algae thereinto in the form of a liquid suspension, the algae removal pond being fluidly connected to the polishing pond for discharge into the polishing pond of algae-free liquid from the sub-surface liquid layer in the algae removal pond, the polishing pond being for further reduction of biochemical oxygen demand by exposure to aeration and sunlight of liquid therein, the sludge pit being for separation of the dead algae from a liquid supernatant, the sludge pit being fluidly connected to the waste stabilization pond for recycling of the supernatant thereinto, the polishing pond having a discharge means for removal of collected treated liquid for final disposal, wherein the waste stabilization pond comprises a combined aerobic and anaerobic pond consisting of a central section having an upper aerobic zone and a lower anaerobic zone, with the surrounding section being entirely aerobic.

16. The system of claim 15 wherein the means for minimizing the euphotic zone comprises natural buoyant algae floating in said algae removal pond.

17. The system of claim 15 wherein the means for minimizing the euphotic zone is an artificial material.

18. The system of claim 17 wherein said artificial material comprises subdivided masses of wood floating in said algae removal pond.

19. The system of claim 17 wherein said artificial material is a cover supported above the liquid in said algae removal pond.

20. The system of claim 19 wherein said cover is styrofoam supported on floats in the liquid in said algae removal pond.

21. The system of claim 15 wherein said waste stabilization pond comprises an aerated pond.

22. The system of claim 15 wherein said polishing pond is formed from a low flat levee surmounted by a weir passing completely around the levee at substantially uniform height, the levee having an outer surface sloping downwardly and outwardly to a toe from said weir for distributing liquid discharge from said polishing pond to give maximum exposure of the discharge to aeration and sunlight.

23. The system of claim 22 wherein said discharge from said polishing pond is collected by ditching at the toe of said outer surface, and said polishing pond has a depth suitable for growing of vegetation therein to promote mixing, aeration and exposure to sunlight.

* * * * *